US010412167B2

(12) United States Patent
Hanney et al.

(10) Patent No.: US 10,412,167 B2
(45) Date of Patent: Sep. 10, 2019

(54) HYBRID CLOUD COMMUNICATION SYSTEM

(71) Applicant: Presidio LLC, New York, NY (US)

(72) Inventors: Stephen Mark Hanney, Los Gatos, CA (US); Christopher Oarion Kreager, Bellingham, WA (US); Jason O'Brien, Austin, TX (US); Fabio Alberto Gutierrez, North Conway, NH (US)

(73) Assignee: Presidio LLC, New York, NY (US)

( * ) Notice: Subject to any disclaimer, the term of this patent is extended or adjusted under 35 U.S.C. 154(b) by 423 days.

(21) Appl. No.: 15/220,779

(22) Filed: Jul. 27, 2016

(65) Prior Publication Data

US 2017/0034255 A1 Feb. 2, 2017

Related U.S. Application Data

(60) Provisional application No. 62/197,397, filed on Jul. 27, 2015, provisional application No. 62/203,786, filed on Aug. 11, 2015.

(51) Int. Cl.
*G06F 15/16* (2006.01)
*H04L 29/08* (2006.01)
(Continued)

(52) U.S. Cl.
CPC ........ *H04L 67/1097* (2013.01); *G06F 16/116* (2019.01); *H04L 41/0843* (2013.01);
(Continued)

(58) Field of Classification Search
CPC ............. H04L 67/1097; H04L 41/0843; G06F 17/30076
(Continued)

(56) References Cited

U.S. PATENT DOCUMENTS 8,364,638 B2 1/2013 Nickolov et al.
9,094,292 B2 7/2015 Tung et al.
(Continued)

FOREIGN PATENT DOCUMENTS

WO 2014088544 6/2014

OTHER PUBLICATIONS

International Application. No. PCT/US2016/044201, International Search Report and Written Opinion dated Oct. 21, 2016, 10 pages.
(Continued)

*Primary Examiner* — Duyen M Doan
(74) *Attorney, Agent, or Firm* — Kilpatrick Townsend & Stockton LLP

(57) ABSTRACT

A system includes a processor and a memory device. The processor may be communicatively couplable to a first computing device corresponding to a consumer and a second computing device corresponding to a service provider. The memory device may be accessible to the processor and including instructions executable by the processor to cause the processor to: (i) receive resource parameters corresponding to information for allowing the consumer to access a computing resource hosted by the service provider on a remote server via a hybrid cloud; (ii) identify a template file including a call format corresponding to an HTTP method; and (iii) generate an adapter using the template file and the portion of the resource parameters.

20 Claims, 15 Drawing Sheets

(51) Int. Cl.
*H04L 12/24* (2006.01)
*G06F 16/11* (2019.01)

(52) U.S. Cl.
CPC .......... *H04L 41/5048* (2013.01); *H04L 67/02* (2013.01); *H04L 67/10* (2013.01); *H04L 41/22* (2013.01); *H04L 41/5054* (2013.01); *H04L 41/5096* (2013.01)

(58) Field of Classification Search
USPC ........................................................ 709/203
See application file for complete search history.

(56) References Cited

U.S. PATENT DOCUMENTS

| | | |
|---|---|---|
| 2009/0300719 A1 | 12/2009 | Ferris |
| 2010/0293269 A1 | 11/2010 | Wilson et al. |
| 2012/0084113 A1 | 4/2012 | Brandwine et al. |
| 2012/0151358 A1 | 6/2012 | Joanny et al. |
| 2012/0173679 A1* | 7/2012 | Li ........................ H04L 67/2823 709/220 |
| 2012/0303807 A1 | 11/2012 | Akelbein et al. |
| 2013/0019011 A1 | 1/2013 | Breitgand et al. |
| 2013/0066940 A1* | 3/2013 | Shao ................... H04L 67/1025 709/201 |
| 2014/0156828 A1* | 6/2014 | Pasternak ......... H04L 29/08099 709/224 |
| 2014/0181677 A1 | 6/2014 | Brandwine et al. |
| 2014/0280494 A1 | 9/2014 | Samoylenko et al. |
| 2014/0337467 A1 | 11/2014 | Pech et al. |
| 2015/0101057 A1 | 4/2015 | Fingold et al. |
| 2015/0128152 A1* | 5/2015 | Lachaume .............. G06F 9/465 719/316 |
| 2015/0229645 A1* | 8/2015 | Keith ..................... H04L 41/50 726/4 |
| 2015/0295731 A1* | 10/2015 | Bagepalli ............ H04L 12/6418 370/401 |

OTHER PUBLICATIONS

International Application No. PCT/US2016/044208, International Search Report and Written Opinion dated Oct. 21, 2016, 14 pages.
U.S. Appl. No. 15/220,762, Non-Final Office Action dated May 31, 2018, 14 pages.
U.S. Appl. No. 15/220,762, "Non-Final Office Action" dated Dec. 26, 2018, 15 pages.

* cited by examiner

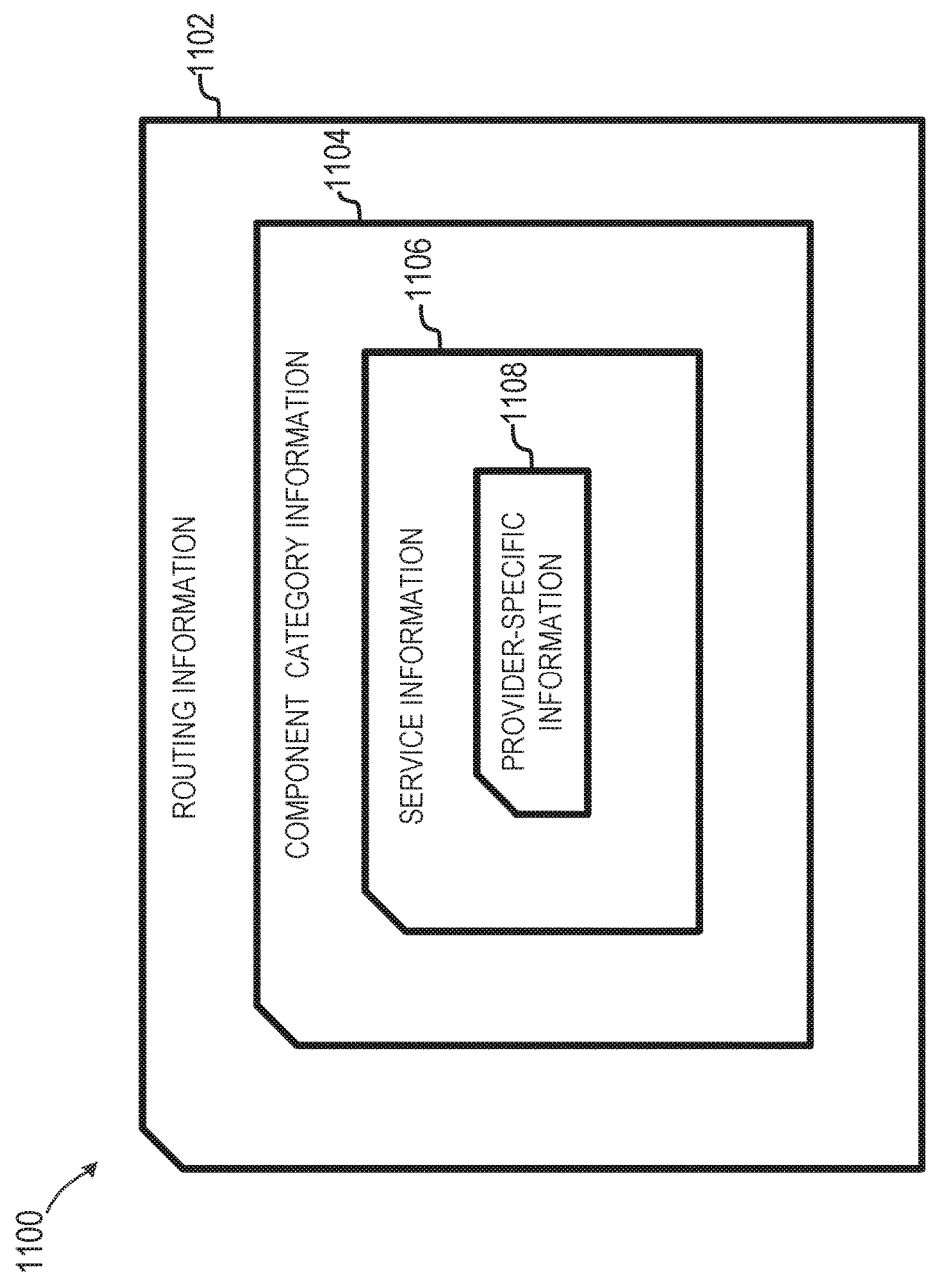

```
{
    "requestID": "myRequestNumber",
    "date": "timestamp",
    "tenant": "myTenantUniqueID",
    "requestorID": "callingPortalUserID"
    "servicename":    "Order VM",
    "serviceParentCategory": "Compute",
    "serviceCategory" "Network Optimized/Video/Streaming",
    "order": {
        "connection": "MySePAccount",
        "details": [
          {
             "id": " ",
             "type": "virtualMachine",
             "specifics": {
                  "name": "humanReadableName",
                  "location": "folderMoRef",
                  "region": "AWSRegion",
                  "resourcePool": "resgroup-71",
                  "description": "myResourceDescription",
                  "compute": { }
             },
             "storage": {
                  "local": [ { "id": "datastore-7935" } ]
             }
             "networks": [ { "id" "dvportgroup-438" } ]
          }
        ]
    }
}
```
— 1200

FIG. 12A

HYBRID CLOUD COMMUNICATION SYSTEM

CROSS-REFERENCE TO RELATED APPLICATIONS

This claims priority to U.S. Provisional Application Ser. No. 62/197,397, filed Jul. 27, 2015 and titled "Hybrid Cloud Management System," and to U.S. Provisional Application Ser. No. 62/203,786, filed Aug. 11, 2015 and titled "Hybrid Cloud Ecosystem Consumption Model," the contents of each of which are incorporated herein by reference.

TECHNICAL FIELD

The present disclosure relates to cloud computer networks, and more particularly, though not necessarily exclusively, to multi-computer data transferring in hybrid cloud environments.

BACKGROUND

A hybrid cloud is an interaction between private and public clouds. Computing resources may be orchestrated between the private and public clouds to provide services to consumers. The private cloud may include a platform designed for use by a single consumer. The public cloud may include a platform having computing resources shared between multiple consumers. As a private cloud is designed to suit a particular consumer's requirements, the processes for invoking requests for particular resources, or other communication within a private cloud, may vary substantially from one private cloud to another designed by a different consumer. Extending multiple private-cloud platforms into a shared public-cloud platform may cause communication issues, such as translating or understanding requests by consumers to providers of computing resources available through the hybrid cloud.

SUMMARY

In some aspects, a system may include a processor communicatively couplable to a first computing device corresponding to a consumer and a second computing device corresponding to a service provider. The system may also include a memory device accessible to the processor and including instructions executable by the processor to cause the processor to receive, from the service provider via a network, resource parameters corresponding to information for allowing the consumer to access a computing resource hosted by the service provider on a remote server via a hybrid cloud. The resource parameters may include JavaScript Object Notation (JSON) data including a hypertext transfer protocol (HTTP) method. The instructions may also be executable by the processor to cause the processor to identify a template file including a call format corresponding to the HTTP method. The template file may be stored in a database and include placeholder information of a type corresponding to at least a portion of the resource parameters. The instructions may also be executable by the processor to cause the processor to generate an adapter using the template file and the portion of the resource parameters. The adapter may be executable to communicate a request to the service provider from the consumer to access the computing resource by executing a routine corresponding to the HTTP method.

In some aspects, a method for establishing a communication path between a consumer and a service provider via a hybrid cloud may include receiving, from the service provider via a network, resource parameters corresponding to information for allowing the consumer to access a computing resource on a remote server via the hybrid cloud. The resource parameters may include JSON data including HTTP methods for communicating with the computing resource. The method may also include identifying, by a processor, a call format corresponding to each of one or more HTTP methods included in the JSON data. The method may also include generating, by the processor, an adapter including one or more routines using the call format corresponding to each of the one or more HTTP methods and the resource parameters corresponding to the computing resource. The one or more routines may correspond to the one or more HTTP methods.

A system may include means for receiving, from a service provider, resource parameters corresponding to information for allowing a consumer to access a computing resource on a remote server via a hybrid cloud. The system may also include means for identifying a call format for a hypertext transfer protocol (HTTP) method included in the resource parameters. The system may also include means for generating an adapter including a routine using the call format and the resource parameters, wherein the routine corresponds to the HTTP method.

BRIEF DESCRIPTION OF THE DRAWINGS

FIG. 11 is a block diagram of a data model of a message corresponding to a consumer request for a computing resource according to some aspects of the present disclosure.

FIGS. 12A-12D are images of an example request formatted according to the data model of FIG. 11 according to some aspects of the present disclosure.

DETAILED DESCRIPTION

Figure 1:
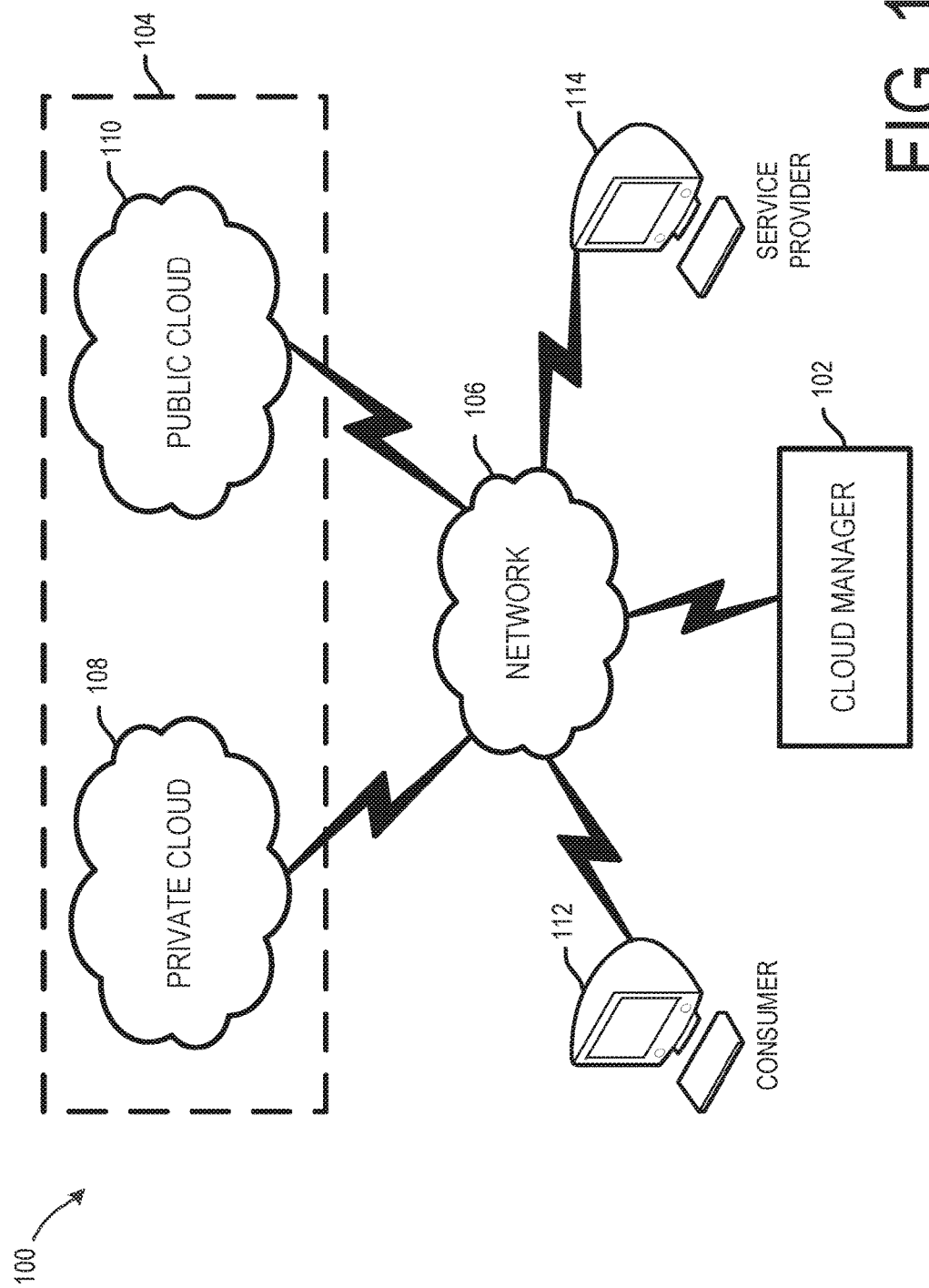
FIG. 1 is a block diagram depicting a hybrid cloud environment according to some aspects of the present disclosure.

Certain aspects and features relate to a hybrid cloud infrastructure for generating an adapter to facilitate communication between a consumer and a service provider. In some aspects, the communication between the consumer and the service provider may involve a request for a computing resource located on a public cloud and associated with the service provider. Non-limiting examples of a computing resource may include a configurable network, processor, storage, virtual machine, or services. A controller device of a hybrid cloud system may operate as a centralized coordinator to generate a communication path between the consumer and the service provider for transmitting requests to the service provider and, in some aspects, allowing the service provider to respond to the request. In one example, a controller device may generate a portal to receive information from the service provider corresponding to a service that the service provider seeks to onboard to the hybrid cloud. The information may include details and parameters necessary to respond to a request from the consumer to provide the computing resource. The controller device may, via an application program interface ("API"), identify predefined call formats corresponding to hypertext transfer protocol ("HTTP") methods from a JavaScript Object Notation ("JSON") schema of data associated with the computing resource. The predefined call formats may include programming code that provides a standardized response to similar requests by different service providers having computing resources available on the hybrid cloud. The controller device may use the predefined call formats to generate an adapter for each type of request allowed by the service provider by applying the information received by the controller device from the service provider to the predefined call formats for each request type. An adapter may be automatically executed in response to a request from a consumer to allow communication between the consumer and the service provider with respect to a computing resource.

In some aspects, a controller device of a hybrid cloud system may generate a portal accessible to a consumer to allow the consumer to initiate communication with a service provider to request a computing resource previously on-boarded to a hybrid cloud by a service provider. The controller device may generate and package a message corresponding to the request. The message may be packaged in a format that is standardized to be received and interpreted by various APIs corresponding to various computing resources. The information specific to the requested computing resource may be used by an adapter for the service provider to respond to the request. In some aspects, the message may include a partially strict schema. For example, the outer layers (e.g., a first layer and a second layer) may include a strict schema that is consistent for messages corresponding to any request received from a consumer, regardless of the service provider from which the computing resource is requested. The inner layers (e.g., a third layer and a fourth layer) may include a relaxed schema that may be changeable depending on the service provider associated with the request.

In one example, a controller device of a hybrid cloud system according to some aspects may receive a request from a consumer via a portal generated by the controller device. The portal may include one or more user interfaces displayed on a user device of the consumer and including selection options or input options to allow the consumer to request a computing resource, such as a service, from a hybrid cloud. The controller device may analyze a first layer of the message generated based on the request to identify the consumer requesting the service and the type of the service The controller device may determine that the requested service is for infrastructure as a service ("IaaS"), such as provisioning a virtual machine for the consumer. The controller device may transmit a second layer of the message included in the first layer of the message to an IaaS engine located in an enterprise service bus of the hybrid cloud system. The IAAS engine may identify a service provider using information included in the second layer of the message and transmit a third layer of the message included in the second layer to a specific IaaS engine for the service provider. The service provider IaaS engine may identify an adapter associated with the service provider and corresponding to the requested service (e.g., an adapter for created a virtual machine). The adapter may use the information in the fourth layer to create a virtual machine for the service provider.

A system according to certain aspects of the present disclosure may standardize requests and calls to computing resources available through a hybrid cloud to facilitate communication between a consumer and providers of the respective computing resources. A standardized request may allow the consumer and the providers to continue internal communications, and communications with the system, in their respectively languages, yet allow communication between the parties to be understood. The use of an adapter to standardize such requests may allow computing resources to be on-boarded to the hybrid cloud more easily as individualized code is generated automatically by the system using the service provider inputs rather than being individually hard-coded for each computing resource of each service provider. Further, using a message having a layered format to transmit consumer requests may provide a standardized approach to the system's facilitating communication between various consumers and various service providers. Communication between the consumers and service providers may be more efficient as each layer may allow the system to funnel the request to an appropriate adapter for calling a desired computing resource corresponding to the request.

Various aspects of the present disclosure may be implemented in various environments. FIG. 1 is a block diagram depicting a hybrid cloud environment 100 in which various aspects may be implemented, according to some aspects of the present disclosure. The hybrid cloud environment 100 includes a cloud manager 102 communicatively coupled to a hybrid cloud 104 via a network 106, such as the Internet. The cloud manager 102 may include one or more systems, servers, processors, or other processing means for managing or controlling access to the hybrid cloud 104, computing resources, and services located on the hybrid cloud 104. In some aspects, the cloud manager 102 may also include a memory, database, or other devices for storing instructions, such as an application program interface, executable by the processing means of the cloud manager 102 to facilitate requests for computing resources and services located on the hybrid cloud 104 and for responding to or otherwise executing such requests.

The hybrid cloud 104 may include a private cloud 108 and a public cloud 110. The private cloud 108 includes a cloud-computing platform operated solely for a consumer 112. In some aspects, all or a portion of the private cloud 108 may be managed by the consumer 112 via the network 106.

In additional and alternative aspects, all or a portion of the private cloud 108 may be managed by the consumer 112 or a third party via the cloud manager 102. Computing resources may be stored or otherwise located on the private cloud 108. For example, the consumer 112 may include a corporation or other business organization having its own computing resources, such as a network including processors and databases for providing particular services to the consumer 112. In some aspects, the private cloud 108 may be located on the premises of the business organization. In other aspects, the private cloud 108 may be located off-site and may be hosted by the cloud manager 102. The public cloud 110 includes a cloud-computing platform having computing resources that are shared between multiple consumers. In some aspects, the public cloud 110 may include one or more pool of computing resources forming virtual data centers that may be provisioned for each consumer accessing the public cloud 110. Non-limiting examples of the computing resources included in the virtual data centers may include processors, networks, bandwidth, memory, virtual machines, and other services. The hybrid cloud 104 may be formed by the private cloud 108 and the public cloud 110 when the consumer 112 requests and consumes computing resources on both the private cloud 108 and the public cloud 110. Although only one private cloud 108 and one public cloud 110 are shown in FIG. 1, the private cloud 108 and the public cloud 110 may each represent multiple private clouds or public clouds, respectively. In this manner, the hybrid cloud 104 according to some aspects of the present disclosure may represent multiple hybrid clouds formed by any number of various private clouds corresponding to each consumer and public clouds having a pool computing resources shared by the consumers.

In some aspects, computing resources may correspond to services provided by a service provider 114. The service provider 114 may be a vendor or other entity providing services available to the consumer in the hybrid cloud 104. The services may be provided under one or more delivery models. For example, the service provider 114 may provide software as a service (SaaS) by hosting software applications running at the service provider 114 and allowing the consumer 112 to subscribe to access to the applications through the public cloud 110. The service provider 114 may additionally or alternative provide IaaS (e.g., infrastructure as a service) by hosting equipment, such as servers, storage, or network components, and allowing the consumer 112 to subscribe to interact with the infrastructure of the service provider 114. In further aspects, the service provider 114 may provide platform as a service (PaaS) where the computing resource includes a platform allowing the consumer 112 to develop, run, and manage applications over the network 106.

The consumer 112 and the service provider 114 may access the hybrid cloud 104 using one or more computing devices. Non-limiting examples of computing devices may include computers, smartphones, tablets, or other devices having means for computing and means for accessing the network 106. In some aspects, the consumer 112 and the service provider 114 may access the hybrid cloud 104 via the network 106 through portals generated by the cloud manager 102. In at least one aspect, the portals may include a user interface or a series of user interfaces having one or more input options or selection options that allow the consumer 112 and the service provider 114 to communicate with each other by inputting or selecting, respectively, information through the portals. For example, the cloud manager 102 may generate a consumer portal accessible to the consumer 112 and including selection options to request a service from the service provider 114. The cloud manager 102 may receive the request through the portal and may communicate the request to the service provider 114 to provide the requested service. In additional and alternative examples, a service provider portal may allow the service provider 114 to onboard a service to the public cloud 110 that may be available to the consumer 112. For example, the cloud manager 102 may generate a service provider portal accessible to the service provider and including input options to allow the service provider 114 to input information necessary to install and execute the service. The cloud manager 102 may use to the information inputted by the service provider 114 to automatically generate an adapter that may be used to communicate with the service provider 114 from the public cloud 110 to respond to a consumer's request for the service.

Figure 2:
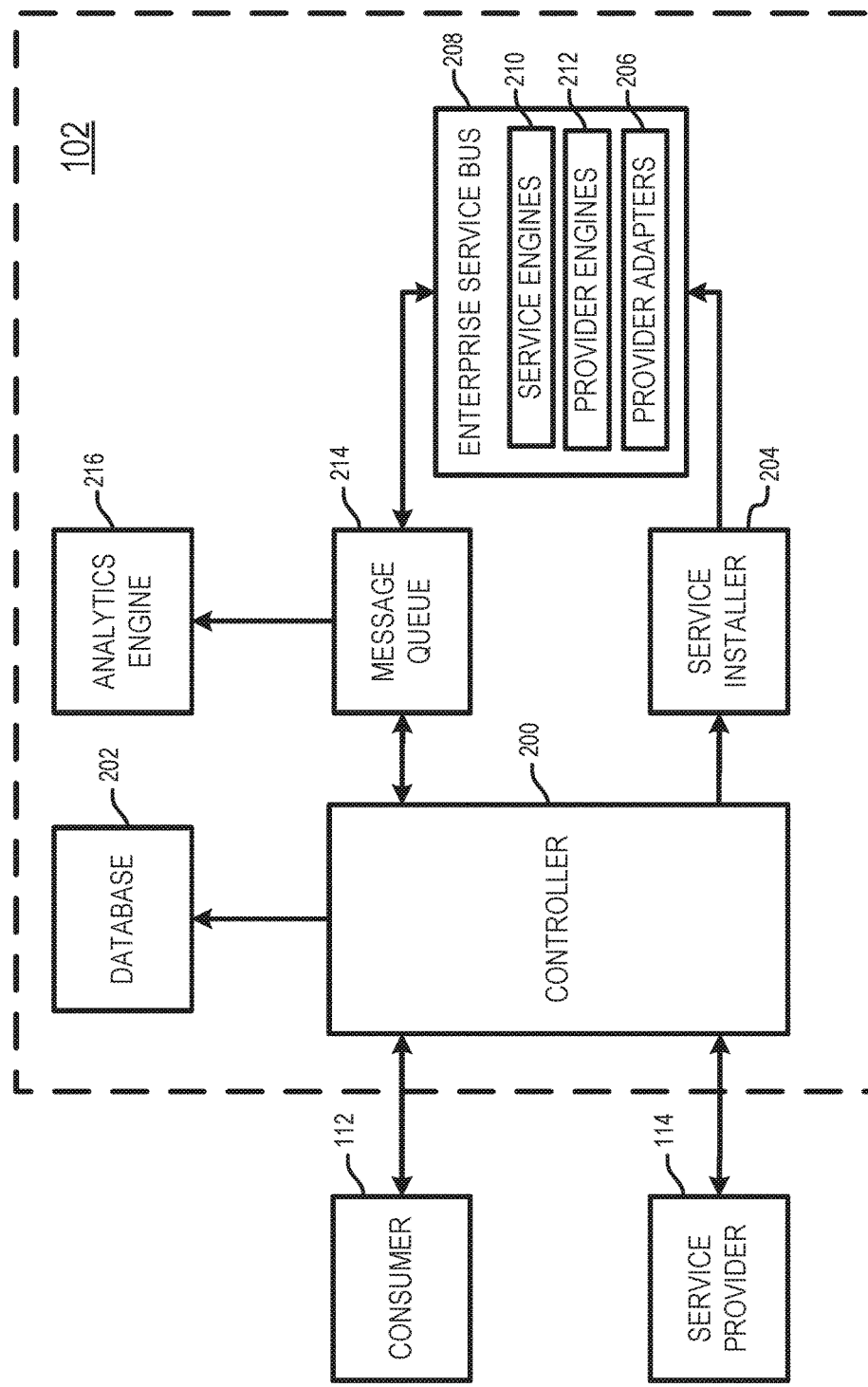
FIG. 2 is a block diagram depicting a flow of data between a consumer and a service provider in the hybrid cloud environment

FIG. 2 is a block diagram depicting a flow of data between the consumer 112 and the service provider 114 in the hybrid cloud environment 100. The cloud manager 102 includes a controller 200 accessible to both the consumer 112 and the service provider 114. In some aspects, the controller 200 may be accessible to the consumer 112 and the service provider 114 via the network 106 as described in FIG. 1. The controller 200 may include one or more devices for coordinating communication between the consumer 112 and the service provider 114. The controller 200 may include one or more processors or other processing means to coordinate the onboarding of computing services from a service provider 114, manage requests from the consumer 112 for the computing services, and manage fulfilling the request by the service provider 114. The controller 200 may receive information from the service provider 114 corresponding to a service that the service provider intends to onboard onto the hybrid cloud 104 of FIG. 1.

In some aspects, the controller 200 may generate a portal for displaying on a computer device of the service provider 114 that includes input or selection options to allow the service provider to input the information. The information may include information necessary to allow the controller 200 to make the computing device accessible to the consumer 112 via the hybrid cloud 104 of FIG. 1, route a request for the computing resource from the consumer 112 to the appropriate service provider 114, and to allow the service provider 114 to respond to the request. Non-limiting examples of information that may be received by the controller 200 from the service provider 114 include: authentication information, timing for calls to the computing resource, identification information for other computing resources associated with the computing resource; a location of the computing resource on the service provider's 114 system (e.g., a uniform resource locator ("URL", a uniform resource identifier ("URI"), etc.), a name of the computing resource, a description of the computing resource, and parameter information needed for onboarding the computing resource and allowing the consumer to request the computing resource. In some aspects, the parameter information may include a JavaScript Object Notation ("JSON") schema, or JSON data. The JSON schema may include one or more hypertext transfer protocol ("HTTP") methods corresponding to various types of requests for the comping resource. Non-limiting examples of the HTTP methods include POST, PUT, GET, and DELETE. The POST method may correspond to creating a computing resource. The PUT method may correspond to modifying the computing resource. The GET method requests data from the computing resource. THE DELETE method may correspond to a request to delete the computing resource. The parameter information may also include parameter types included in the JSON schema, including, but not limited to, BODY, REST, QUERY, and HEADER. The controller 200 may store the information in a database 202

The controller 200 may execute or activate a service installer 204. In some aspects, the service installer 204 may correspond to hardware, such as a server, processor, or other device means for onboarding the service to the hybrid cloud 104 of FIG. 1. In other aspects, the service installer 204 may correspond to a routine, engine, device, or other means executable by a processor of the controller 200 to onboard the service. The service installer 204 may generate one or more adapters 206 using predefined call formats, or templates, corresponding to the HTTP methods included in the JSON schema. The adapters 206 may include files, such as Javascript files, executable by the controller 200 or other processing means of the cloud manager 102 to make a call to the service provider 114 in a standardized format (e.g., JSON). The adapters 206 may be integrated into an enterprise service bus 208.

The adapters 206 may be executed by service engines 210 and provider engines 212 integrated into the enterprise service bus 208. The service engines 210 and the provider engines 212 may correspond to routines or other means for transmitting a request from the consumer 112 for a computing resource to the provider adapter 206 corresponding to the service provider 114. The service engines 210 may correspond to a type of computing resource requested by the consumer 112. For example, the service engines 210 may include engines corresponding to SaaS or IaaS service models. The provider engines 212 may correspond to a service provider 114. The provider engines 212 may receive information from the service engines 210 corresponding to a service provider 114 and may execute an appropriate provider adapter 206 associated with the service provider 114 and corresponding to the request for a computing resource.

In some aspects, the controller 200 may generate a consumer portal including one or more user interfaces displayable on a consumer's 112 computing device. The consumer portal may include selection options or input options to allow the consumer 112 to request a computing resource from the hybrid cloud 104 of FIG. 1 and corresponding to the service provider 114. Through the portal, the consumer 112 may transmit the request to the controller 200. In some aspects, the consumer portal may be generated by the controller 200 using an API to convert the request to a format according to a standardized data model. In other aspects, the controller 200 may execute an API to generate a message corresponding to the request and formatted in a standardized manner to facilitate communicating the request to the appropriate service provider 114. The controller 200 may transmit the message to a queue 214. The queue 214 may include a storage device, memory, or other storage means for temporarily storing the message before the message is transmitted to the enterprise service bus 208 for further processing. In some aspects, the queue 214 may transmit messages to the enterprise service bus 208 on a first-come-first-service basis. In other aspects, the queue 214 may transmit the message to the enterprise service bus 208 based on other factors, such as a type associated with the request, an indicator packaged in the message indicating that that the message is of a higher priority than other messages.

The message may be received from the message queue and may be transmitted to a service engine 210 associated with the type of computing resource requested by the consumer 112. In some aspects, the information corresponding to the type of computing resource may be included in the message itself The service engine 210 may identify the provider engine 212 corresponding to the message. The information corresponding to the service provider 114 may also be included in the message itself. The provider engine 212 for the consumer 112 may execute an adapter 206 corresponding to the request and associated with the computing resource of the service provider. The information used to determine the appropriate adapter may be also included in the message itself. The adapter 206 may be executed and cause the cloud manager 102 to transmit the request for the computing resource to the service provider 114 by performing a call to the service provider based on the HTTP method associated with the adapter 206. One of the service engines 210, provider engines 212, or the adapters 206 may also be configured to return a message to the controller 200 via the queue 214.

In some aspects, messages held in the message queue 214 may also be retrieved by an analytics engine 216. In some aspects, the analytics engine 216 may include instructions executed by a processor of the controller. In other aspects, the analytics engine 216 may include instructed executed by another processor or other processing means of the cloud manager 102. The instructions of the analytics engine 216 may include routines or engines for tracking consumption data. For example, the instructions may include one or more routines configured to store messages from the queue, including both consumer requests and service provider responses related to computing resources available in the hybrid cloud 104 of FIG. 1, in the database 202, and retrieving messages from the database 202. The instructions may also include one or more routines configured to extract information from the messages stored in the database 202 or the queue 214 regarding each computing resource, each type of computing resource, or some other relationship between the messages and to analyze information regarding each relationship. The instructions may also include one or more routines configured to generate charts, tables, or other visual means for displaying individualized or aggregated information related to the computing resources available on a consumer portal or a service provider portal generated by the controller 200.

Figure 3:
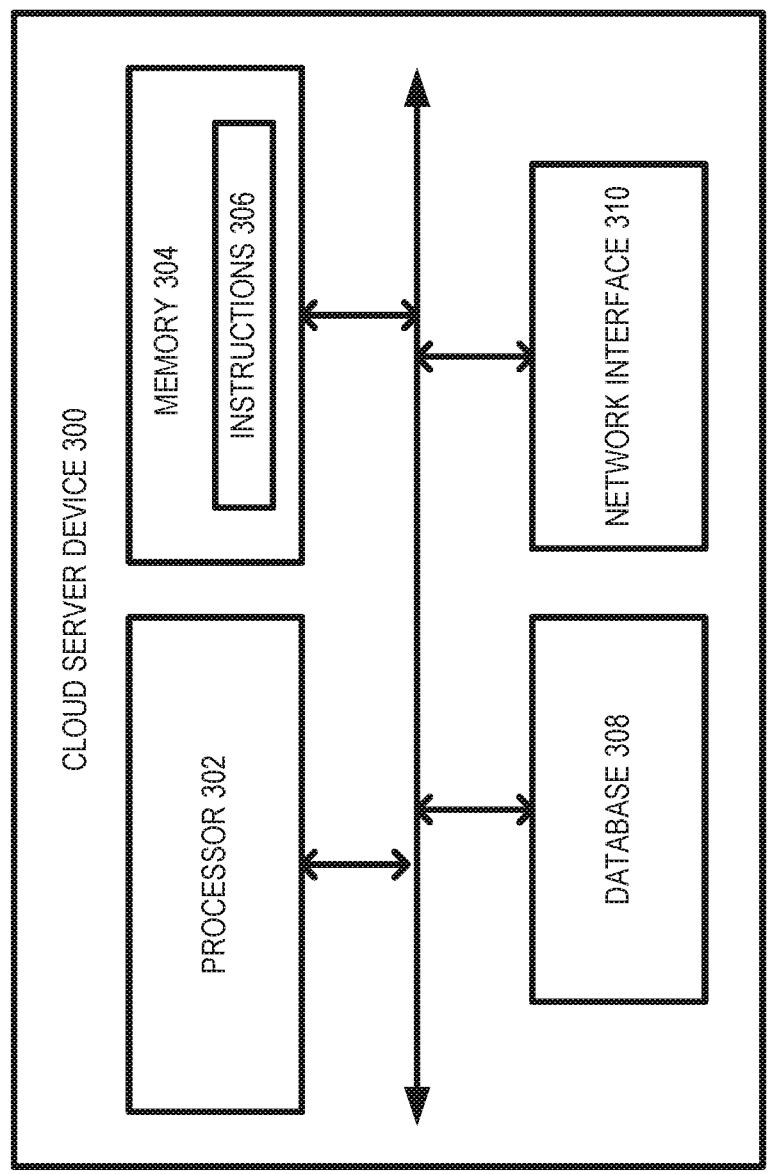
FIG. 3 is a block diagram depicting a cloud server device for the hybrid cloud environment of FIG. 1 according to some aspects of the present disclosure.

FIG. 3 is a block diagram depicting a cloud server device 300 for the hybrid cloud environment 100 according to some aspects of the present disclosure. In some aspects, the cloud server device 300 may represent the controller 200 of the cloud manager 102 of FIG. 2, though the cloud server device 300 may represent any server device in the hybrid cloud environment 100 including or requiring processing means for facilitating communication between the consumer 112 and the service provider 114 of FIG. 1.

The cloud server device 300 includes a processor 302 and a memory 304. The processor 302 and the memory 304 may be communicatively coupled via a bus or other suitable connection means. The processor 302 may include a single processing device or multiple processing devices. Non-limiting examples of the processor 302 include a field-programmable gate array, an application-specific integrated circuit ("ASIC"), and a microprocessor. The processor 302 may execute instructions 306 stored in the memory 304 to perform the operations of the controller 200 of FIG. 1. The memory 304 includes a storage device that retains information when powered off. Non-limiting examples of the memory 304 include electrically erasable and programmable read-only memory, a flash memory, or any other type of non-volatile memory. In some aspects, at least a portion of the memory 304 may include a computer-readable medium from which the processor 302 can read the instructions 306. A computer-readable medium may include electronic, optical, magnetic, or other storage devices capable of providing the processor 302 with computer-readable instructions or other program code. Non-limiting examples of a computer-readable medium include, but are not limited to, magnetic disks, memory chips, ROM, random-access memory ("RAM"), an ASIC, a configured processor, optical storage, or any other medium from which a compute processor can read the instructions 306. The instructions 306 may include processor-specific instructions generated by a compiler or an interpreter from code written in any suitable computer-programming language, including, for example, C, C++, Java, etc. In some aspects, the instructions 306 may include program engines, such as, but not limited to, the service engines 210 and the provider engines 212 of FIG. 2. In additional and alternative aspects, the instructions 306 may include one or more application program interfaces, such as a representational state transfer (REST) application program interface to generate user interfaces for receiving information from each of the consumer 112 and the service provider 114, onboarding a service to the hybrid cloud 104 of FIG. 1, and packaging the information received from the consumer 112 and the service provider 114 into a formatted message for communicating a request, or a response to a request, to access a computing resource corresponding to the service. In further aspects, the instructions 306 may include one or more matching algorithms or searching algorithms for identifying a subset of information included within a set of information.

The cloud server device 300 also includes a database 308 and a network interface 310. The database 308 and the network interface 310 may be accessible to the processor 302 and the memory 304 via a bus or other suitable connection means. The database 308 may represent a single database or multiple databases. In some aspects, the database 308 may correspond to the database 202 of FIG. 2. The database 308 may include one or more memory locations or other storage means for storing information received from the consumer 112 and the service provider 114 of FIG. 1 and information generated by the processor 302. The network interface 310 may include a network card or other device communicatively coupled to the network 106 of FIG. 1 to allow the consumer 112 and the service provider 114 to access the private cloud 108 and the public cloud 110 through the cloud manager 102. In some aspects, the network interface 310 may transmit user interfaces generated by the processor 302 via the network 106 of FIG. 1 to the consumer 112 and the service provider 114 to facilitate communication between the consumer 112 and the service provider 114 through the cloud manager 102. In additional aspects, user interfaces may include consumer portals and service provider portals including selection options or input options to receive information from the consumer 112 and the service provider 114, respectively, to be communicated to the other.

Figure 4:
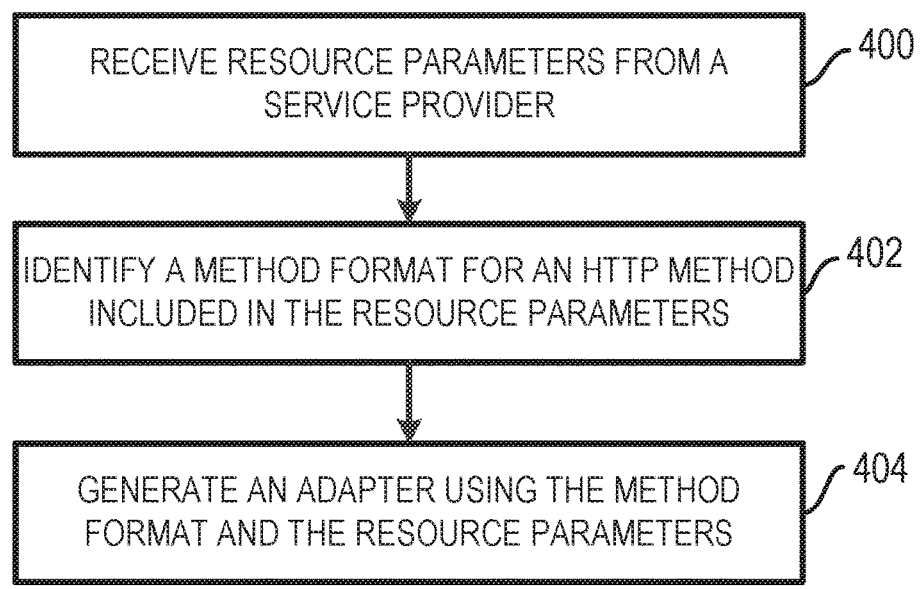
FIG. 4 is a flow chart of a process for establishing a communication path between a consumer and a service provider for a computing resource in a hybrid cloud according to some aspects of the present disclosure.

FIG. 4 is a flow chart of a process for establishing a communication path between a consumer and a service provider for a computing resource in a hybrid cloud according to some aspects of the present disclosure. The process is described with reference to FIGS. 1-3, unless otherwise indicated, though other implementations are possible without departing from the scope of the present disclosure.

In block 400, resource parameters are received from a service provider. In some aspects, the resource parameters may be received via the network 106 by the cloud manager 102, the controller 200, the network interface 310, the processor 302, or other means for receiving the resource parameters. For example, the processor 302 may execute instructions 306 to generate one or more user interfaces that may be transmitted to the service provider 114 via the network 106 by the network interface 310 for display on a computing device of the service provider 114 as a service provider portal. The user interfaces may include one or more input options or selection options to allow the service provider 114 to input the resource parameters. In some aspects, the input options or selection options may represent a form containing questions or types of information requested with the consumer inputting or selecting a response via the options. In additional and alternative aspects, the input options may allow a user to upload a file. For example, the user may upload a file including the information requested by the system. In further aspects, the file may be written in a RESTful API Modeling Language ("RAML"). The RAML file may be received by means for receiving the resource parameters to generate an adapter directly, without first mapping the information to a standardized format to generate the adapter, as described in the remaining steps of the process.

Figure 5:
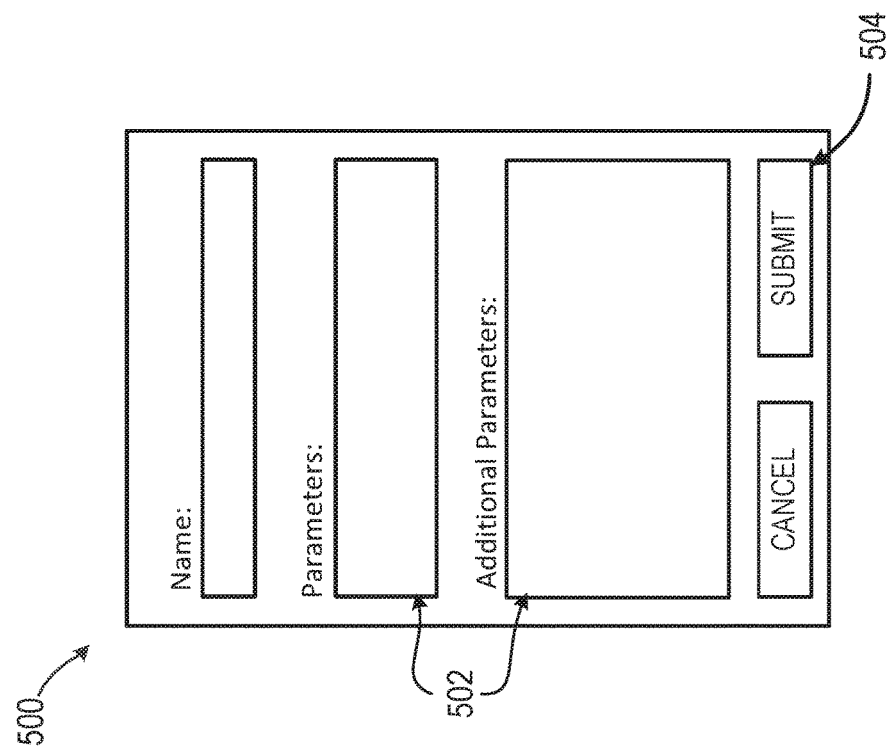
FIG. 5 is a screen shot of an example of a user interface including a service provider portal for inputting information for accessing a computing resource according to some aspects of the present disclosure.

FIG. 5 is a screen shot depicting of an example of a user interface 500 that may be generated to receive the resource parameters. The user interface 500 may be transmitted to a computing device of the service provider 114 via the network 106 or other suitable means to be displayed on the computing device. The user interface 500 includes input options 502 in which the service provider 114 may enter resource parameters via a keyboard or other input means of the computing device. The user interface 500 also includes a selection option 504 that may be selected by the service provider 114 via a selection tool or other selection means of the computing device. Selecting the selection option 504 may generate a signal to cause the resource parameters entered into the input options 502 to be transmitted to the cloud manager 102 or other means for receiving the resource parameters via the network 106. In some aspects, the resource parameters may include a JSON schema with one or more HTTP methods (e.g., GET, POST) corresponding to calls that may be received by the service provider 114 for the computing resource.

Returning to FIG. 4, in block 402, a method format for an HTTP method included in the resource parameters may be identified. The method format may include an arrangement of information serving as a template for similar information. The method format may be included a file stored in the database 202 or other storage means. The method format may correspond to the HTTP method received from the service provider 114. The method format may be identified by the cloud manager 102, the processor 302, the controller 200, the service installer 204, instructions 306 in memory, or other means for identifying the method format.

Figure 6:
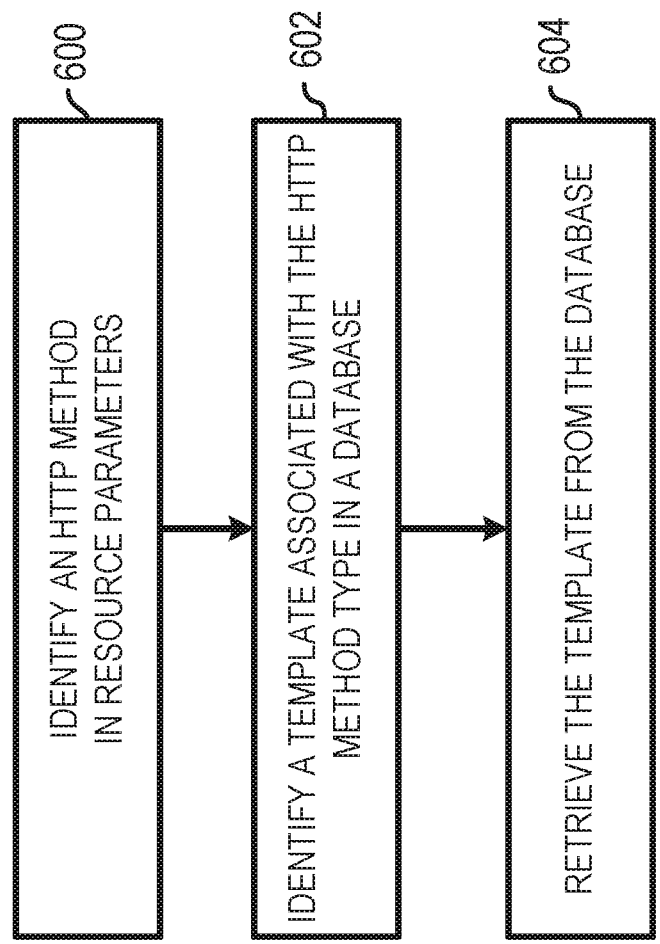
FIG. 6 is a flow chart of a process for identifying a hypertext transfer protocol method according to some aspects of the present disclosure.

FIG. 6 is a flow chart of a process for identifying a method format according to some aspects of the present disclosure. In block 600, the HTTP method is identified in resource parameters received from the service provider 114. In some aspects, the HTTP method may represent or be included in a JSON schema. In block 602, a template associated with the HTTP method type may be identified in a database (e.g., database 202 of FIG. 2). For example, the method format may correspond to a template file including a format for making a call in a manner identical or similar to a GET method or a POST method. In block 604, the template file may be opened, selected, or retrieved from the database.

Returning to FIG. 4, in block 404, an adapter is generated using the method format and the resource parameters. The adapter may include a routine for calling, or otherwise communicating with, the computing resource provided by the service provider 114. In some aspects, the adapter may generated by the cloud manager 102, the processor 302, the controller 200, the service installer 204, instructions 306 in memory, or other means for generating an adapter.

Figure 7:
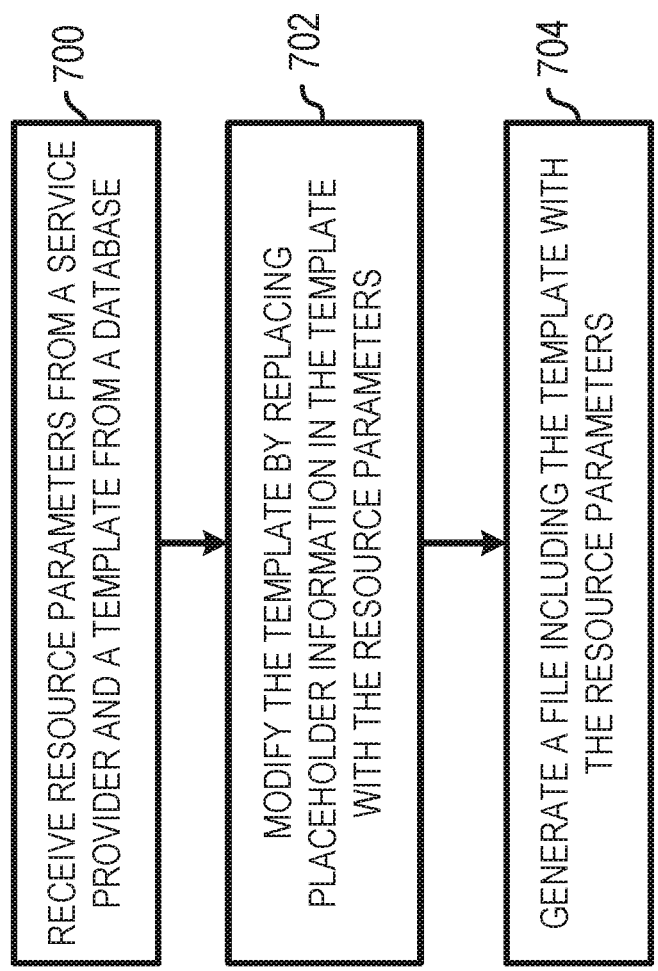
FIG. 7 is a flow chart of a process for generating an adapter for calling a computing resource according to some aspects of the present disclosure.

FIG. 7 is a flow chart of a process for generating an adapter for a computing resource according to some aspects of the present disclosure. In block 700, resource parameters and a template file including a method format are received. The resource parameters may correspond to all or a subset of the resource parameters received from the service provider 114 of FIG. 1. The template file may be retrieved from a database. In block 702, the template file is modified by replacing placeholder information in the template with the resource parameters. In some aspects, the placeholder information may include information corresponding to the type of resource parameter that should be included in its position in the template file. For example, the placeholder information may correspond to location information and may be replaced by resource parameters such as URI associated with a computing resource. The resource parameters may replace the placeholder information until no placeholder information remains in the template. In block 704, file including the template with the resource parameters included in place of the placeholder information is generated to operate as an adapter. The file may be generated by compiling, closing, or otherwise saving the modified template. In some aspects, the file may be deployed to an enterprise service bus for use as an adapter including a routine for communicating with the service provider 114 to call a computing resource associated with the adapter.

Figure 8:
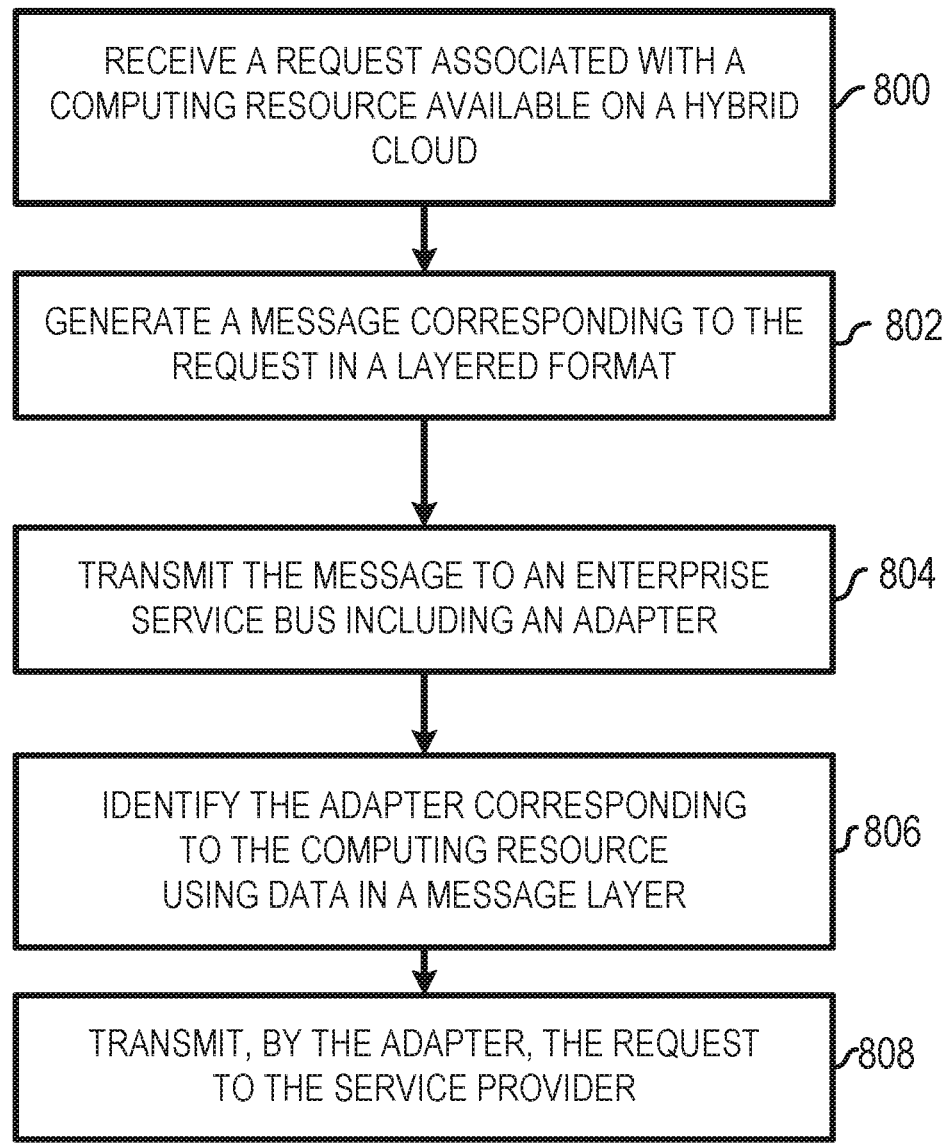
FIG. 8 is a flow chart of a process for requesting a computing resource according to some aspects of the present disclosure.

FIG. 8 is a flow chart of a process for communicating a consumer request for a computing resource of a service provider according to some aspects of the present disclosure. The process is described with reference to FIGS. 1-3, unless otherwise indicated, though other implementations are possible without departing from the scope of the present disclosure.

In block 800, a request associated with a computing resource available through the hybrid cloud 104 is received from the consumer 112. In some aspects, the request may be received from the consumer 112 via a computing device of the consumer 112. In some aspects, the request may be received via the network 106 by the cloud manager 102, the controller 200, the network interface 310, the processor 302, or other means for receiving the request. For example, the processor 302 may execute instructions 306 to generate one or more user interfaces that may be transmitted to the consumer 112 via the network 106 by the network interface 310 for display on a computing device of the consumer 112 as a consumer portal. The user interfaces may include one or more input options or selection options to allow the consumer to input a request corresponding to a computing resource.

Figure 9:
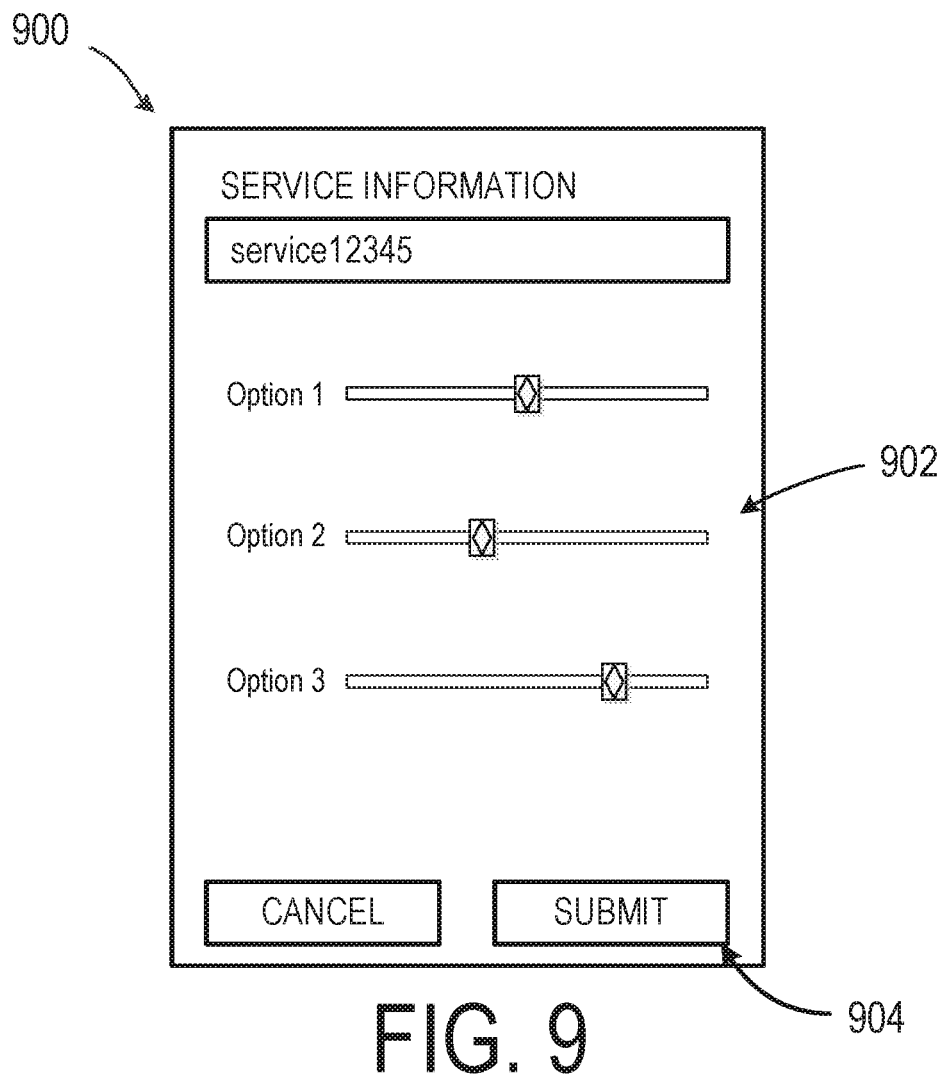
FIG. 9 is a screen shot of an example of a user interface including a consumer portal for initiating a request to a computing resource according to some aspects of the present disclosure.

FIG. 9 is a screen shot of an example of a user interface 900 including a consumer portal for initiating a request to a computing resource according to some aspects of the present disclosure. The user interface 900 may be transmitted to a computing device of the consumer 112 via the network 106 or other suitable means to be displayed on the computing device. The user interface 900 includes selection options 902 to allow the consumer 112 to customize a request to an identified consumer resource available via the hybrid cloud 104. The user interface 900 also includes selection option 904 that may be selected by the consumer 112 via a selection tool or other selection means of the computing device. Selecting the selection option 904 may generate a signal to cause the request entered into the input options or input options to be transmitted to the cloud manager 102 or other means for receiving the request via the network 106.

Returning to FIG. 8, in block 802, a message is generated corresponding to the request. The message may be generated in a layered format including different types of data in each layer of the message. For example, a first layer may receive data corresponding to a first data type, a second layer may receive data corresponding to a second data type, a third layer may receive data corresponding to a third data type, and so on. In some aspects, the data may be arranged in the message in layers resembling an "onion" where each layer encompasses additional data corresponding to an internal layer. For example, layer one may include a first type of data, but also encompass each of the remaining layers. A second layer may not include the first layer, but may include data corresponding to a third layer. In some aspects, the layers of data that may be separately processed to interpret the request. The message may be generated by the cloud manager 102, the controller 200, the network interface 310, the processor 302, or other means for generating the message from the convert.

Figure 10:
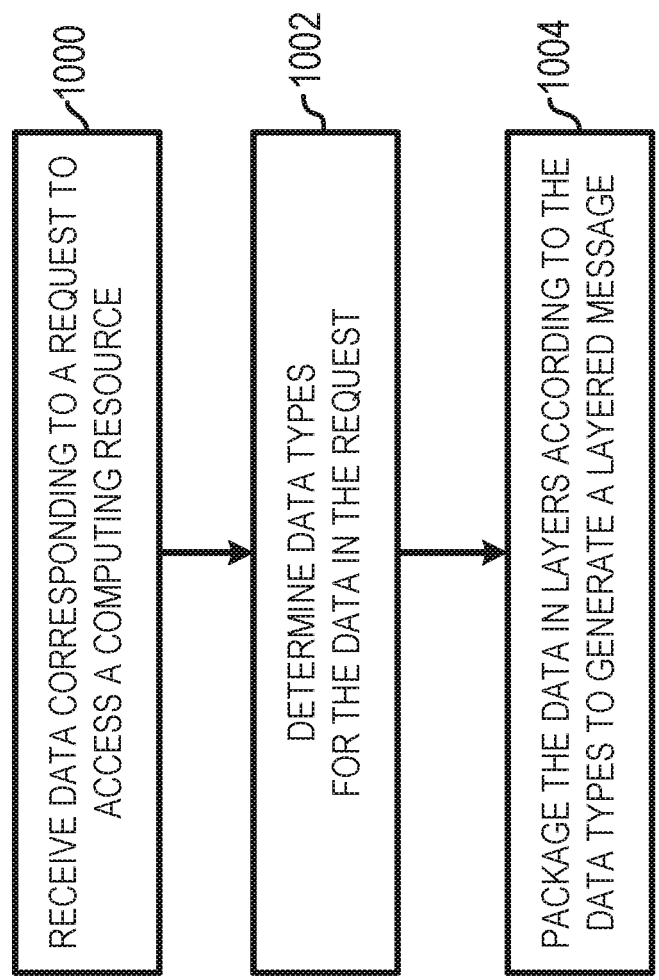
FIG. 10 is a flow chart of a process for generating a message from a request to access a computing resource according to some aspects of the present disclosure.
Figure 12B:
Figure 12C:
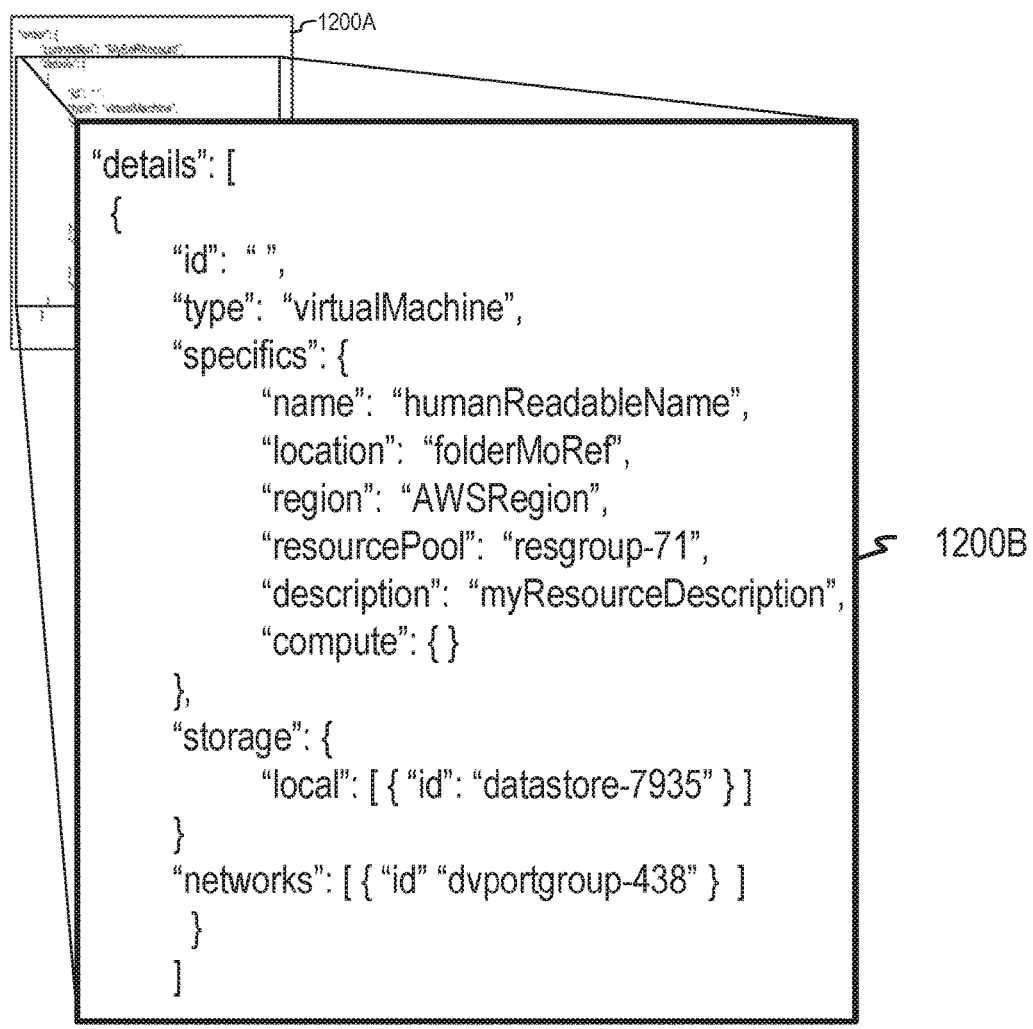
Figure 12D:
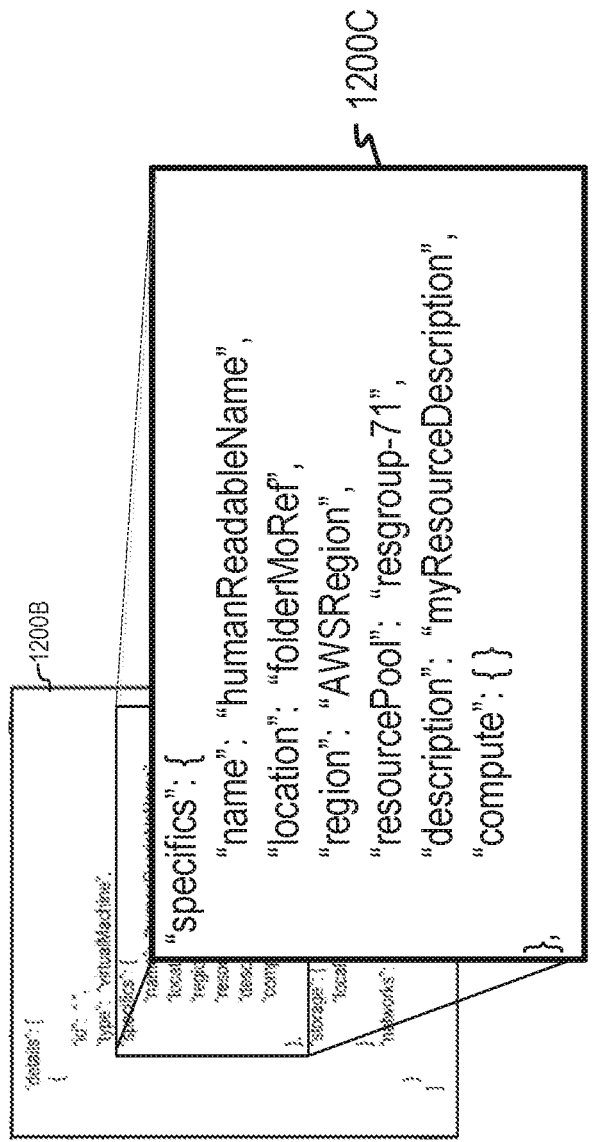

FIG. 10 is a flow chart of a process for generating a message from a request to access a computing resource according to some aspects of the present disclosure. In block 1000, data corresponding to a request to access a computing resource is received. In some aspects, the data may be received directly from a computing device of the consumer 112 via the network 106 based on an input or selection by the user corresponding to the request. In other aspects, the data may be received indirectly from the computing device and through an intermediary device, such as a network interface.

In block 1002, data types for the data in the request are determined. For example, the data may include routing information, component category information, service information, and provider-specific information. The routing information may include information corresponding to the type of computing resource requested (e.g., SaaS, IaaS, PaaS). The category information may corresponding to a specific job for the computing resource and identify a service provider 114 having computing resources for performing the job. The service information may include information corresponding to the computing resource (e.g., service) requested by the consumer 112. The provider-specific information may include information identifying the adapter to be called from the enterprise service bus 208 (e.g., an HTTP method corresponding to the adapter or information identifying an HTTP method).

In block 1004, the data is packaged in layers according to the data type to generate a layered message. For example, a first layer of the message may include the routing information. A second layer within the first layer of the message may include the category information. A third layer within the second layer may include the service information. A fourth layer within the third layer may include the provider-specific information.

FIG. 11 is a block diagram of a data model 1100 of a message corresponding to a consumer request for a computing resource according to some aspects of the present disclosure. The outer layer 1102 includes routing information. The outer-middle layer 1104 includes component category information. The inner-middle layer 1106 includes service information. The inner layer 1008 includes provider-specific information. Although only four layers are shown in the data model 1100 of a message corresponding to a consumer request to access a computing resource, the message may include any number of layers, including one, or five or more, without departing from the scope of the present disclosure.

Returning to FIG. 8, in block 804, the message is transmitted to the enterprise service bus. In some aspects, the message may be transmitted to the enterprise service bus 208 from the message queue 214. In block 806, an adapter corresponding to the computing resource is identified using data in a layer of the message. For example, the adapter 206 may be identified using the provider-specific information in the inner layer 1108 of the data model 1100 of FIG. 11. The provider-specific information may include an HTTP method or other information identifying an HTTP method corresponding to the adapter 206. In some aspects, the adapter 206 may be identified by the cloud manager 102, the controller 200, the processor 302, or other means for identifying an adapter based on data included in the message. For example, the controller 200 may include a processor that executes the provider engine 212 corresponding to the service provider 114 identified by the data corresponding to the service information included in the inner-middle layer 1106 of the data model 1100 of the message of FIG. 11.

In block 808, the request is transmitted to the service provider 114 by the adapter 206 corresponding to the requested computing resource. The adapter 206 may be executed by the controller 200, the processor 302, or other means for executing the adapter 206. The adapter 206 may transmit the request as a call via the network 106 to the service provider 114. In some aspects, the service provider 114 may response to the request by creating, provisioning, modifying, deleting, or performing some other action with respect to the identified computing resource according to the request and may transmit information back to the consumer 112 via the hybrid cloud 104.

FIGS. 12A-12D are images of an example of a consumer request 1200 formatted according to the data model 1100 of FIG. 11 according to some aspects of the present disclosure. The first layer of the request 1200 corresponding to the routing information included in the outer layer 1102 of the data model 1100 of FIG. 11 includes a service name (e.g., "servicename": "Order VM"). The service name indicates that the request includes an order for a computing resource corresponding a virtual machine (or VM). Since the computing resource is an infrastructure, the request may be routed to the service engine 210 in the enterprise service bus 208 that is an IaaS service engine. The IaaS service engine 210 may receive at least a second layer 1200A of the request 1200 (shown in FIG. 12B). The second layer 1200A includes a connection (e.g., "connection"; "MySePAccount") corresponding to service provider 114 of the requested virtual machine. The IaaS service engine 210 may analyze the second layer 1200A and may route the third layer 1200B of the request 1200 (shown in FIG. 12C) to the provider engine 212 corresponding to the service provider 114 for the virtual machine ordered by the consumer 112. The provider engine 212 may analyze the third layer 1200B and may determine an appropriate adapter 206 for calling the virtual machine based on the identification (e.g., "id": " ") included in the third layer 1200B. The blank "id" field in the third layer 1200B may indicate that the request is that the virtual machine be created and correspond to a POST HTTP method. The provider engine 212 may verify that the POST functionality requested is available in an adapter 206 in the enterprise service bus corresponding to a POST method. The provider engine 212 may leverage the functionality of the adapter 206 corresponding to the service provider 114 and the POST method to transmit a call to the service provider 114 to create the ordered virtual machine. The fourth layer 1200C (shown in FIG. 12D) may include the information used by the adapter to convert the request to a format readable by the service provider 114.

Examples of Scenarios for Communicating Through the Hybrid Cloud

The following examples describe scenarios for communicating between the consumer 112 and the service provider 114 of FIG. 1 in the hybrid cloud environment 100 and facilitating such communication. These illustrative scenarios are mentioned not to limit or define the scope of the disclosure, but rather to provide examples to aid understanding thereof.

Scenario One: Consumer Sequencing

The consumer 112 may be presented a consumer portal on a computing device. The consumer portal may include services or other computing resources available to the consumer 112 and its employees through the hybrid cloud 104. In some aspects, the portal may allow the consumer 112 to generate educated comparisons of similar services. The comparisons may be based upon generic search phrases, or by service provider 114. In additional aspects, the consumer portal may also allow the consumer to filter the available services and view the services in a format or order based on a number of reviews or average ratings of a service provider or service.

The consumer 112 may select a service from a service provider 114 that the consumer 112 wishes to make available for various divisions or groups within the consumer's 112 organization. The service may be published in an internal portal corresponding to the consumer 112. In some aspects, the service may be published in an internal catalog to make the services available to forecast and budget for using the service. The hot of the hybrid cloud 104, through the cloud manager 102 or through other means may plan a consumption level for the consumer 112. In some aspects, the analytics engine 216 may include a routine configured to retrieve historical data stored in the database 202 of FIG. 2 to forecast a consumption level for the consumer 112. In additional aspects, an account quota may be established using the forecast of service usage by the consumer 112. The account quote may be tied to a funding source to predict a cost associated with using the service by the consumer 112. End users (e.g., employees of the consumer 112) may be exposed to the service through the portal to allow them to use and "order," or select, the service within the consumer's 112 organization. In some aspects, the end users allowed to use a particular service may be restricted to individuals having a particular role or seniority in the consumer's organization. In additional and alternative aspects, the consumer 112, via a manager or some other individual in the consumer's 112 organization may be allowed to prove or deny a service requisition. The approval or denial may be based on factors, such as the service level budget, forecast, or perceived need or available remaining resources.

The service may be provisioned and activated for the consumer 112. In some aspects, the cloud manager 102 may notify the consumer 112, or its end users, that the ordered service has been activated and is ready for consumption. In some aspects, the notification may be transmitted to the end user via email, text messaging or the consumer portal as a notification or alert. The consumer 112 may be permitted to manage the lifecycle of the service after activation by communicating with the service provider through the cloud manager 102. For example, a service may be deactivated, decommissioned, reassigned, placed on hold or upgraded.

The cloud manager 102 may be able to track consumption of the service by the consumer 112 in real-time. For example, the analytics engine 216 may monitor and analyze the queue 214 for communication between the consumer 112 and the service provider 114 with respect to the service provided. The analytics engine 216 may cause a report to be generated corresponding to the service or other computing resource consumed by the consumer 112. This information may be stored in the database 202 and used by the cloud manager 102 or another entity to provide visibility into how the original forecast of service consumption compares to the established quotas. In some aspects, the quotas maybe adjusted based on empirical reporting of the actual consumption. For example, the quota may be adjusted where 80% of an estimated service usage is consumed in the first quarter of the service period. The analytics engine 216 may also be used to track and measure aggregate consumption for a variety of services across one consumer 112 or a set of consumers. In some aspects, the analytics engine 216 may include additional instructions to provide an alert message, or warning indicator, to optimize consumption across the set of consumers for each project, portfolio, or fiscal period.

Scenario Two: Service Provider Sequencing

The service provider 114 may be presented a service provider portal on a computing device. The service provider 114 may enter information corresponding to a service to onboard the service to the hybrid cloud 104 according to some aspects of the present disclosure. The cloud manager 102, via the controller 200, another processor 302, or other processing means, may generate one or more adapters including routines for calling the computing resource. Following onboarding of the service, the service provider may be presented with additional questions via the portal to allow computing resources corresponding to the service to be placed in the proper category on the consumer portal and to establish a skin form branding the service provider 114 or the computing resource. The service provider 114 may also browse and select pre-existing services, or other computing resources, to be launched in the hybrid cloud 104. The cloud manager 102 may customize the customer portal to give the computing resource or set of computing resources selected by the service provider 114 a signature look and feel. For example, the logo of the service provider 114 may be uploaded to the consumer portal as well as any other pertinent information needed to complete the branding for the computing resource or set of resources provided by the service provider 114. In some aspects, the branding for all computing resources provided by the service provider 114. In other aspects, the branding may be different for individual or subsets of the computing resources provided by the service provider 114.

The cloud manager 102 may validate the adapter 206 or the computing resource on-boarded by the service provider 114 by sending a mock request for the computing resource to the service provider 114 o verify that the request is fulfilled. The computing resource may thereafter be published in a catalog accessible to the consumer 112 via a consumer portal. In some aspects, the service provider 114 can publish or augment computing resources in the consumer portal. The analytics engine 216 may monitor the message queue 214 to determine the consumption of the computing resource by consumers 112.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system, comprising:
 a processor communicatively couplable to a first computing device corresponding to a consumer and a second computing device corresponding to a service provider; and
 a memory device accessible to the processor and including instructions executable by the processor to cause the processor to:
  receive resource parameters from the service provider via a network, the resource parameters including information for allowing the consumer to access a computing resource hosted by the service provider on a remote server via a hybrid cloud, wherein the resource parameters are provided in a JavaScript Object Notation (JSON) format and indicate a hypertext transfer protocol (HTTP) method for communicating with the service provider;
  identify a template file configured to use the HTTP method as a call format from among a plurality of template files stored in a database, wherein the template file includes placeholder information;
  replace the placeholder information in the template file with at least some of the resource parameters to generate a modified template file; and
  generate an adapter using the modified template file, the adapter being configured to:
   receive a request from the consumer to access the computing resource hosted by the service provider; and
   communicate the request to the service provider by executing a routine corresponding to the HTTP method.

2. The system of claim 1, wherein the resource parameters further include a host of the computing resource, a port for allowing communication between the hybrid cloud and the remote server, a communication path between the hybrid cloud and the remote server, a content type associated with the computing resource, and encoding information for accessing the computing resource from the hybrid cloud.

3. The system of claim 1, wherein the adapter is a Javascript file including the resource parameters formatted in the call format.

4. The system of claim 1, wherein the memory device includes additional instructions executable by the processor to cause the processor to:
 receive the request associated with the computing resource from the first computing device, the request including identifying information for identifying which adapter among a plurality of adapters corresponds to the service provider hosting the computing resource;
 generate a message based on the request, the message having a layered format including a plurality of layers, each layer of the plurality of layers including a different type of identifying information associated with the computing resource; and
 transmit the message to an engine within an enterprise service bus, the engine being executable to analyze the plurality of layers of the message to identify the adapter from among the plurality of adapters as corresponding to the service provider hosting the computing resource and responsively transmit a call associated with the computing resource.

5. The system of claim 4, wherein the plurality of layers includes:
a first layer including routing information identifying a service type corresponding to the computing resource;
a second layer including category information identifying the service provider of the computing resource;
a third layer including service information identifying the adapter corresponding to the computing resource, the service information including method information identifying the HTTP method corresponding to the adapter; and
a fourth layer including provider-specific information useable by the adapter to convert the call into a format readable by the second computing device corresponding to the service provider of the computing resource.

6. The system of claim 4, wherein the memory device includes instructions executable by the processor to cause the processor to identify the adapter from the plurality of adapters by:
identifying a service type associated with the computing resource based on a first subset of the identifying information;
identifying the service provider of the computing resource based on a second subset of the identifying information included within the first subset of the identifying information; and
identifying the adapter based on a third subset of the identifying information included within the second subset of the identifying information.

7. The system of claim 4, wherein the memory device includes instructions executable by the processor to cause the processor to:
generate a first user interface that is displayable on the first computing device, the first user interface including one or more input options, wherein each input option of the one or more input options corresponds to a parameter type and is configured to allow the service provider to input a resource parameter having the parameter type; and
generate a second user interface that is displayable on the second computing device, the second user interface including one or more selection options selectable by the consumer and corresponding to one or more computing resources available from the service provider through the hybrid cloud.

8. A method for establishing a communication path between a consumer and a service provider via a hybrid cloud, comprising:
receiving, by a processor, resource parameters from a service provider via a network, the resource parameters include information for allowing the consumer to access a computing resource hosted by the service provider on a remote server via the hybrid cloud, wherein the resource parameters are provided in a JavaScript Object Notation (JSON) format and indicate a hypertext transfer protocol (HTTP) method for communicating with the service provider;
identifying, by the processor, a template file configured to use the HTTP method as a call format from among a plurality of template files stored in a database, wherein the template file includes placeholder information;
replacing, by the processor, the placeholder information in the template file with at least some of the resource parameters to generate a modified template file; and generating, by the processor, an adapter using the modified template file, the adapter being configured to:
receive a request from the consumer to access the computing resource hosted by the service provider; and
communicate the request to the service provider by executing a routine corresponding to the HTTP method.

9. The method of claim 8, wherein at least a portion of the placeholder information includes an information type, wherein the portion of the placeholder information is replaceable by one or more of the resource parameters having a parameter type corresponding to the information type, wherein the template file is a Javascript file.

10. The method of claim 8, wherein the resource parameters further include at least one of a host of the computing resource, a port for allowing communication between the hybrid cloud and the remote server, a path between the hybrid cloud and the remote server, a content type associated with the computing resource, or encoding information for accessing the computing resource from the hybrid cloud.

11. The method of claim 8, further including:
receiving, from the consumer via the network, a request associated with the computing resource from the consumer, the request including identifying information for identifying which adapter among a plurality of adapters corresponds to the service provider hosting the computing resource;
generating, by the processor, a message based on the request, the message having a layered format including a plurality of layers, each layer of the plurality of layers including a different type of identifying information associated with the computing resource; and
transmitting the message to an engine within an enterprise service bus, the engine being executable to analyze the plurality of layers of the message to identify the adapter from among the plurality of adapters as corresponding to the service provider hosting the computing resource and responsively transmit a call associated with the computing resource.

12. The method of claim 11, wherein generating the message corresponding to the request includes:
extracting a plurality of data types from the request; and
generating the message such that each data type of the plurality of data types is packaged in a different layer of the plurality of layers.

13. The method of claim 11, wherein identifying the adapter from the plurality of adapters includes:
identifying a service type associated with the computing resource based on a first subset of the identifying information;
identifying the service provider of the computing resource based on a second subset of the identifying information included within the first subset of the identifying information; and
identifying the adapter based on a third subset of the identifying information included within the second subset of the identifying information.

14. The method of claim 8, further including tracking consumption of the computing resource by the consumer by counting how many times a new message corresponding to a request from the consumer is identified in a message queue.

15. A system, comprising:
a processor; and
a memory device comprising instructions that are executable by the processor for causing the processor to:

receive resource parameters from a service provider via a network, the resource parameters including information for enabling a consumer to interact with a computing resource hosted by the service provider via a hybrid cloud, wherein the information specifies at least two hypertext transfer protocol (HTTP) methods with which the hybrid cloud is to communicate with the service provider; and generate an adapter including (i) a first routine configured to use a first call format corresponding to a first HTTP method among the at least two HTTP methods, and (ii) a second routine configured to use a second call format corresponding to a second HTTP method among the at least two HTTP methods.

16. The system of claim 15, wherein the adapter is generated using a template file that includes the first call format, the template file including placeholder information that is replaceable by at least one resource parameter based on an parameter type associated with the at least one resource parameter, wherein the template file is a Javascript file.

17. The system of claim 15, wherein the memory device further comprises instructions that are executable by the processor for causing the processor to:
receive a request corresponding to the computing resource from the consumer;
generate a message based on the request, the message having a layered format including a plurality of layers, each layer of the plurality of layers including different identifying information for identifying the adapter corresponding to the computing resource; and
identify the adapter from a plurality of adapters using the different identifying information in at least one layer of the plurality of layers of the message.

18. The system of claim 17, wherein the different identifying information includes:
a first set of information identifying a service type corresponding to the computing resource associated with the adapter;
a second set of information identifying the service provider of the computing resource associated with the adapter; and
a third set of information identifying the first HTTP method or the second HTTP method associated with the adapter.

19. The system of claim 18, wherein the first set of information is included in a first layer of the plurality of layers of the message, wherein the second set of information is included in a second layer of the plurality of layers of the message, and wherein the third set of information is included in a third layer of the plurality of layers of the message.

20. The system of claim 15, wherein the resource parameters are provided in a JavaScript Object Notation (JSON) format.

* * * * *